(12) United States Patent
Kucharczyk et al.

(10) Patent No.: US 7,792,046 B2
(45) Date of Patent: Sep. 7, 2010

(54) ETHERNET SWITCH-BASED NETWORK MONITORING SYSTEM AND METHODS

(75) Inventors: David Kucharczyk, Santa Fe, NM (US); Jan A. Hinshaw, Saratoga, CA (US)

(73) Assignee: VSS Monitoring, Inc., Burlingame, CA (US)

( * ) Notice: Subject to any disclaimer, the term of this patent is extended or adjusted under 35 U.S.C. 154(b) by 342 days.

(21) Appl. No.: 12/157,043

(22) Filed: Jun. 5, 2008

(65) Prior Publication Data

US 2009/0303883 A1    Dec. 10, 2009

(51) Int. Cl.
*H04L 1/00*    (2006.01)
(52) U.S. Cl. .................. 370/244; 370/463; 370/413
(58) Field of Classification Search ................. 370/389, 370/390, 392, 352–354, 242, 244, 413, 463; 709/224, 225, 238, 250; 714/2, 25, 712, 714/715
See application file for complete search history.

(56) References Cited

U.S. PATENT DOCUMENTS

| | | | |
|---|---|---|---|
| 5,781,318 | A | 7/1998 | Tremblay |
| 5,940,376 | A | 8/1999 | Yanacek et al. |
| 6,041,037 | A | 3/2000 | Nishio et al. |
| 6,327,400 | B1 | 12/2001 | Harstead et al. |
| 6,424,627 | B1 | 7/2002 | Sørhauh |
| 6,441,931 | B1 | 8/2002 | Moskovich et al. |
| 6,560,229 | B1 | 5/2003 | Kadambi et al. |
| 6,898,632 | B2 | 5/2005 | Gordy et al. |
| 6,975,209 | B2 | 12/2005 | Gromov |
| 7,102,887 | B2 | 9/2006 | Blackwell |
| 7,260,120 | B2 | 8/2007 | Kang et al. |
| 7,277,957 | B2 | 10/2007 | Rowley |
| 2003/0112760 | A1 | 6/2003 | Puppa |
| 2004/0120259 | A1 | 6/2004 | Jones |
| 2005/0005031 | A1 | 1/2005 | Gordy et al. |
| 2005/0129033 | A1 | 6/2005 | Gordy et al. |

(Continued)

FOREIGN PATENT DOCUMENTS

WO    WO-2006/031486 A2    3/2006

OTHER PUBLICATIONS

VSS Monitoring Inc., Easy Install Guide, P/N: V1.1 CC-F, Desc. 10/100/1000 1×1 Copper Tap, 8 pages, (C)2003-2005, VSS Monitoring Inc.

(Continued)

*Primary Examiner*—Ian N Moore
(74) *Attorney, Agent, or Firm*—Sonnenschein Nath & Rosenthal LLP

(57) ABSTRACT

A network data monitoring device provides for the flexible, programmable port-to-multi-port steering of data packet traffic between network port pairs, with tap data streams being directed to any of a plurality of monitor ports. The network data monitoring device is constructed utilizing one or more switching integrated circuits programmed to disable layer-2 routing and impose port-to-multiport data packet steering. Physical layer protocol encoding/decoding circuits enable connectivity to physical network media connectors though a system of fail-safe relays. A system controller, preferably implemented by a microprocessor, is connected to all switching integrated circuits and relays for configuration, status and control. Hardware-based logic selectively in complement to the switching integrated circuits provides for the programmable filtering, modification and programmable steering of data packets through the device.

16 Claims, 5 Drawing Sheets

U.S. PATENT DOCUMENTS

| | | |
|---|---|---|
| 2005/0257262 A1 | 11/2005 | Matityahu |
| 2006/0002370 A1 | 1/2006 | Rabie et al. |
| 2006/0083511 A1 | 4/2006 | Edmunds |
| 2006/0153177 A1 | 7/2006 | Worrall et al. |
| 2007/0174492 A1 | 7/2007 | Light et al. |
| 2007/0180152 A1 | 8/2007 | Montanez |
| 2007/0253349 A1 | 11/2007 | Light et al. |
| 2008/0049627 A1 | 2/2008 | Nordin |
| 2010/0135323 A1 | 6/2010 | Leong |

OTHER PUBLICATIONS

VSS Monitoring, Inc., Data Sheet for P/N. V1.1 C.C-F, 101100/1000 1×1 Copper Tap, 2 pages, (C)2003-2004, VSS Monitoring, Inc.

VSS Monitoring, Inc., Promotional Materials for Link Safe Feature of 10/100/1000 Copper Taps, 1 page, (C)2003-2005, VSS Monitoring, Inc.

Peribit Networks, Inc., PeriScope Central Management System (CMS) 5.0 Administrator's Guide, Part No. 100316, Rev. 003, pp. 100-102 (c)2003-2004, Peribit Networks, Inc.

Peribit Networks, Inc., Sequence Reducer/Sequence Mirror Operator's Guide, Part No. 1000068, Rev. 013A, pp. 24, 60-61 (c)2001-2005, Peribit Networks, Inc.

Canary Communications, Inc. product literature for Fast Ethernet Fiber-to-Fiber Converters, 7 pages, (C)2004, Canary Communications, Inc.

Transitions Networks, Inc. 100Base-TX/100BBase-FX Media Converters E-100BTX-FX-04 User's Guide, 4 pages, (C) 1998-2000, Transitions Networks, Inc.

VSS Monitoring; PCT/IB2009/53393 filed Aug. 5, 2009; ISA/US; Feb. 1, 2010; 3 pages.

| Mac Address | VLan | Valid | Time to Live | Static | | Port |
|---|---|---|---|---|---|---|
| 000000000001 | 0 | 1 | 0 | 1 | ──▶ | 0 |
| 000000000002 | 0 | 1 | 0 | 1 | ──▶ | 1 |
| 000000000003 | 0 | 1 | 0 | 1 | ──▶ | 2 |
| 000000000004 | 0 | 1 | 0 | 1 | ──▶ | 3 |
| 00000000000X | 0 | 1 | 0 | 1 | ──▶ | N |

LOCKED SWITCH ROUTING TABLE

FIG. 4

| Network Port | VLan |
|---|---|
| 0 | 1 |
| 1 | 1 |
| 2 | 2 |
| 3 | 2 |
| 4 | 3 |
| 5 | 3 |
| 6 | 4 |
| 7 | 4 |
| 8 | 5 |
| 9 | 5 |
| 2N | N |

VLAN ASSOCIATIONS

| Monitor Port | VLan |
|---|---|
| 0 | 1 |
| 1 | 2, 3, 4 |
| 2 | 5..N |
| 3 | 5..N |

FIG. 5

| Ingress Port | Egress Port | | | | | | | | | |
|---|---|---|---|---|---|---|---|---|---|---|
| | Network Port | | | | | | Monitor Port | | | |
| 0 | 0 | 1 | 0 | 0 | 0 | 0 | 1 | 0 | 0 | 0 |
| 1 | 1 | 0 | 0 | 0 | 0 | 0 | 1 | 0 | 0 | 0 |
| 2 | 0 | 0 | 0 | 1 | 0 | 0 | 0 | 1 | 0 | 0 |
| 3 | 0 | 0 | 1 | 0 | 0 | 0 | 0 | 1 | 0 | 0 |
| 2N | 0 | 0 | 0 | 0 | 1 | 0 | 0 | 0 | 0 | 1 |

EGRESS MASKS

FIG. 6

ETHERNET SWITCH-BASED NETWORK MONITORING SYSTEM AND METHODS

BACKGROUND OF THE INVENTION

1. Field of the Invention

The present invention relates generally to methods of monitoring data transiting switched packet networks and, more particularly, to the use of modified conventional network switching integrated circuits to implement network data stream monitoring as well as aggregation and filtering of the monitored data streams.

2. Description of the Related Art

Switched packet data networks, such as the Internet and related intranets, characteristically using an Ethernet-based transport protocol, rely on a variety of network infrastructure devices including, in particular, discrete path routing network switches to efficiently distribute packet data streams while maintaining end-to-end connectivity and data throughput. Earlier data stream distribution devices operated as simple, multi-ported hubs that replicated all inbound data packets on any given port to all other ports. This had the undesirable effect of flooding all connected network segments with data packets, even where data packet transmission was pertinent to only one segment. In addition to creating a rather substantial and unnecessary bandwidth burden, such an unrestrained distribution of data packets to all network segments would create security exposures. Current conventional Ethernet switches employ intelligent or learned routing techniques to identify and establish specific port-to-port data packet transfers through the switches. A complex of internal routing tables and related data structures are dynamically built and maintained to ensure optimal transfer of data packets through a switch. The goal of conventional switches is to minimize switch transit latency and uniquely route data packets between ingress and egress port pairs.

The effectiveness of current conventional network switches in performing port-to-port routing, however, greatly complicates efforts to monitor and evaluate on-going data stream transport throughout typically large scale networks. Intentional administrative network monitoring is desirable, if not as a practical matter required, to enable ongoing evaluation and analysis of network infrastructure performance, including network segment loading, protocol and end-point routing usage, infrastructure configuration and optimization planning, and various forms of error-detection that may reveal present or predict future network infrastructure failures. In addition, ongoing network monitoring is essential to detecting the source and nature of intrusion attempts and other security concerns.

Various network elements and associated analysis methods have been devised and, over time, evolved, to enable appropriate administrative monitoring of switched data networks. Early techniques, which may in some cases still be employed, involve a passive tapping of network segments combined with an analog amplification of the derived network data stream signals. These techniques suffer from a number of disadvantages, including signal quality degradation in the tapped network segment, excessive noise in the tapped data stream, and incompatibility with certain encoding schemes. For example, a protocol such as the 1000Base-T version of IEEE 802.3z standard supports both ends of a network segment simultaneously transmitting on a single wire. In general, a passive tap cannot be used to capture and accurately reproduce the bidirectional packet data stream.

More recently devised active tap devices, such as shown in U.S. Pat. No. 6,424,627, issued Jul. 23, 2002 to Sorhaug et al., are designed to be physically inserted into network segments and digitally copy all passing data packets to a network monitoring device. Implemented as stand-alone devices, these active taps are useful, though limited by the inability to aggregate, filter or otherwise manipulate the tapped data stream packets. They also do not allow for a means of the complex port configuration required in large installations that mix legacy and current state of the art equipment.

Subsequent monitoring device designs, such as shown in U.S. Pat. No. 6,898,632, issued May 24, 2005 to Gordy et al., while more flexible, remain limited in terms of functionality. The described device is tailored specifically to providing intrusion detection and, where identified, to inject network data packets directed to a firewall to specifically configure the firewall to block the intrusion traffic. The device is not, however, capable of broader use, given no capability to deal with network segments where trunking is enabled or where the data stream packet flow allows re-use of network MAC addresses. In either scenario, use of the disclosed intrusion detection device will instead cause mis-routing of data packets and concomitant data loss.

Another approach to monitoring network data streams, such as shown in U.S. Pat. No. 5,940,376 issued Aug. 17, 1999 to Yanacek et al., relies on existing infrastructure network switches having built-in SPAN or MIRROR port capabilities. This approach requires each network switch to internally implement promiscuous copying of the network data streams passing through the switch with negotiated redirection to a designated monitor probe end-point. As described, this approach allows network data streams between any two end-points to be monitored at least where a transiting infrastructure network switch implements MIRROR ports. To enable monitoring of an entire network, a high percentage of the switches must implement MIRROR ports with compatible negotiation capabilities to select a designated monitor probe port. Beyond the increased network switch costs, disadvantages include a significant increased internal bandwidth requirement to support internal derivation and routing of the tapped data streams and a corresponding network performance degradation due to the transport of the tapped data streams to the designated monitor probe ports.

SUMMARY OF THE INVENTION

A purpose of the present invention is to provide a monitoring device with a discrete port-to-multi-port data packet routing capability that efficiently enables simultaneous transparent tapping of multiple network links, aggregation of one or more tapped data streams to any of multiple output data streams for connection to and monitoring by data analyzers, intrusion detection and prevention devices, usage accounting and billing systems, storage devices or other network administration and management equipment requiring visibility into current network traffic.

This is accomplished in the present invention by manipulating the functional operation of conventional Ethernet switching integrated circuits to construct a flexibly configurable, low-cost, high-performance active network tap system optionally including active filtering of network data packets, aggregation of data streams for monitoring, and controlled priority management of monitor packet delivery. This is achieved in a network tap infrastructure device utilizing one or more switching integrated circuits connected through physical layer protocol encoding/decoding circuits to physical network media connectors though a system of fail-safe relays or a passive tap. A system controller, preferably implemented by a microprocessor, is connected to all switching integrated circuits and relays for configuration, status and control of the network tap system. Multiple management ports may be hosted by the system controller, enabling flexible local and remote administration. Programmable configuration of the switching integrated circuits by the system controller selectively enables full speed pass-through of the network link data stream packets while actively supporting simultaneous analysis services on multiple monitor ports with a further ability to dynamically adjusted delivery of tap data packets to any of the monitoring ports.

In alternate embodiments of the present invention, the switch integrated circuits are supported by additional processing circuits provided between the physical layer integrated circuits and switch integrated circuits to provide enhanced capabilities related to the filtering, forwarding, and priority tagging of network data packets based on various internal and external related factors, including packet content and packet ingress port.

Thus, an advantage of the present invention is that it is capable of utilizing re-targeted, high-performance network switch integrated circuits to construct a flexible, active network tap system. A system controller, readily implemented using a commodity microcontroller, is capable of autonomously configuring and managing ongoing operation of the network switch integrated circuits through power-on, connection negotiation, switched path selection, and failure handling. A system of virtual network paths can be imposed on the data streams transiting the network switch integrated circuit, enabling dynamic steering of tapped data packets streams to any of multiple monitoring ports while preserving the integrity of the original data segment. The virtual network path operation can be implemented transparent to any attached devices.

Another advantage of the present invention is that, through management configuration, the monitored data streams can be defined to support channel bonding and prioritization of the monitored data packets. Aggregated data streams can be switched through bonded monitor ports, enabling analysis of a monitor data stream that exceeds the single channel bandwidth of the network infrastructure. Ongoing internal management of the active network tap system operates to ensure that the monitor data stream does not exceed the bandwidth capabilities of the assigned monitor port or ports by dynamically adjusting the filtering of the monitor port data stream based on management defined prioritization of the monitored data stream packets.

Still another advantage of the present invention is that the system controller operates to ensure transparent operation of the active network tap system relative to the network link segments connected to the active network tap system. Potential differences in end-point negotiated connection protocols for a pair of network link segments are recognized and resolved dynamically by operation of the system controller. Connection link configuration differences at power-on of the active network tap system are handled appropriately to ensure that eventual connection pair operates using a mutually compatible speed and duplex.

A further advantage of the present invention is that ingressing data streams can by dynamically processed to control the delivery of topped data packets to monitoring ports. Packet inspection is used to filter and differentially determine the steering of data packets through the network switch integrated circuits. Any combination of packet tagging and injection of follower data packets can be used to mark and add information to the data packet stream for use in controlling the selection of tapped data packets, determination of a destination monitor port, and the selective addition of monitoring device significant information to tapped data packets, directly or as provided by a follower data packet.

BRIEF DESCRIPTION OF THE DRAWINGS

The present invention is illustrated by way of example, and not limitation, in the figures of the accompanying drawings where like reference numerals refer to like elements and where:

FIG. 4 illustrates a modified MAC address routing table as implemented in a preferred embodiment of the present invention;

FIG. 5 illustrates a virtual network table utilized in a preferred embodiment of the present invention to establish port-to-multiport transfer of data packets within an active tap network monitoring system;

FIG. 6 illustrates an egress mask-based control table that can be used in preferred embodiments of the present invention to further determine the permitted transfer of network data packets through an active tap network monitoring system;

DETAILED DESCRIPTION OF THE INVENTION

Figure 1:
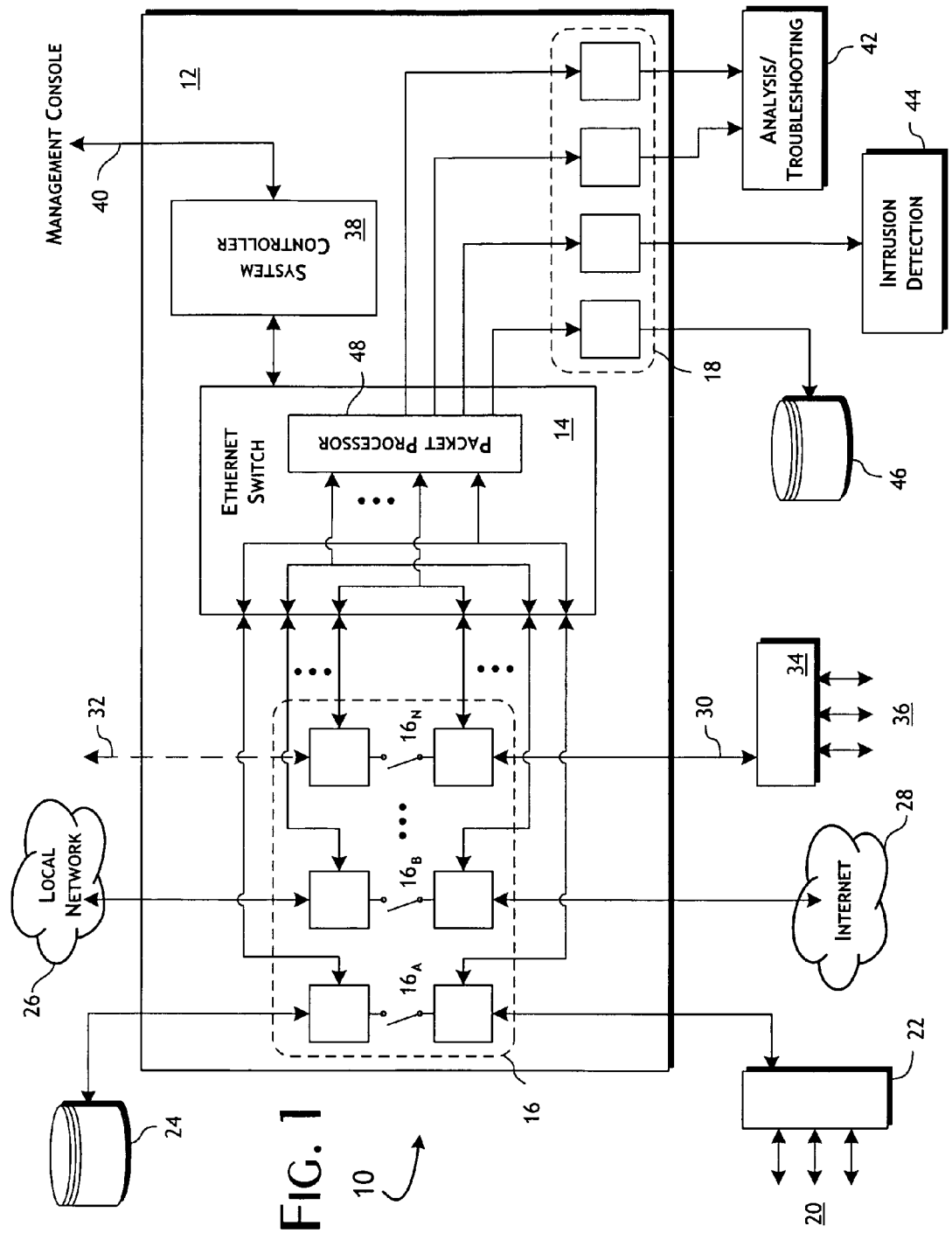
FIG. 1 presents a functional block diagram illustrating an active tap network monitoring system constructed in accordance with a preferred embodiment of the present invention.

As generally shown in FIG. 1, an active tap network monitoring system 10, constructed in accordance with the present invention, presents a set of network ports that operate as interconnecting data stream links for multiple network segments within a network infrastructure. The active tap network monitoring system 10 also provides a set of monitor ports that output network data streams derived or tapped from the network data streams to external monitoring devices variously for analysis, recording, and reporting. In a preferred embodiment of the present invention, the active tap network monitoring system 10 is constructed as a self-contained, rack-mountable device 12 containing a modified Ethernet switch 14 interconnected between an array 16 of fail-safe relay switched links for network segments and an array 18 of active top network monitor ports.

As shown for purposes of illustration, a network link 16A enables tap monitoring of network traffic between client computer systems and other network devices 20 connected to a conventional external switch or router 22 and a file server 24. Thus, for existing network segments, the device 12 is placed in-line physically intercepting the network cabling, establishing a network segment link through two ports on the device 12. The physical embodiment of the ports may be electrical, such as appropriate for copper cable, or optical, such as appropriate for multi-mode or single mode fiber. Another network link 16B is shown as used to tap network traffic between a local or internal network 26 and an external network or Internet 28. In an initial preferred implementation, twenty-four network ports 16, supporting linking of twelve discrete network segments, are supported by a single device 12. Each network link port pairing is preferably interconnected by a fail-safe physical data link bypass mechanism. When the device is powered down, failed, or otherwise inactive, electro-mechanical relays or passive loop-throughs are used to maintain data connectivity through network link port pairs. Loss of power or hardware failure within the device 12 will therefore not interrupt the flow of network traffic transiting the device 12.

Network tap monitoring expansion is enabled by utilizing one or more designated network ports, such as network port 30, as a MIRROR port input. In typical usage scenarios, the corresponding output port 32 of the network link 16N is not used. An external switch or router 32 allows any number of tapped network data streams, originating from remote monitoring ports 18 on other devices 12, to be collected and transferred through the device 12 to any of the local network monitor ports 18.

The modified Ethernet switch 14 is preferably constructed through the altered and augmented use of conventional, commodity switched network integrated circuits. A preferred switched network integrated circuit is the BCM5396, a sixteen port gigabit-Ethernet switch manufactured by Broadcom Corporation, Irvine, Calif. As configured under control of a system controller 38, the modified Ethernet switch 14 operates to provide an active network data stream transport path for each network segment connected through the modified Ethernet switch 14 and, concurrently, derive a tap data stream from each network transport path data stream. As network segment traffic is bi-directional, the modified Ethernet switch 14 enables real-time aggregation of both unidirectional streams. The internally produced tap data stream, each corresponding to a respective 16A-16N data stream, thus presents a combined network traffic view of the corresponding network segment.

The internal tap data streams are, in accordance with the present invention, selectively subject to packet filtering, packet prioritization, stream aggregation, and steering to the network monitor ports 18. Operative configuration and control of the modified Ethernet switch 14 is preferably provided by the dedicated system controller 38. A preferred system controller 38 is the RCM3000 embedded microcontroller manufactured by Rabbit Semiconductor, Inc., Davis, Calif. In alternate embodiments, the system controller 38 may be implemented using a general purpose microprocessor or a dedicated logic circuit implemented using a conventional field programmable gate array (FPGA) or other similar technologies. The system controller 38 preferably implements a persistent control program and configuration data store and supports external connection 40 for access by a management console appropriate to enable administrative management of the device 12.

The network monitor ports 18 are preferably implemented as Ethernet ports, supporting any combination of copper and optical interfaces. In an initially preferred embodiment of the present invention, the device 12 supports four network monitor ports 18 that route monitored data streams to external devices, chosen dependent on use scenario. For example, network monitor ports 18 can be connected directly to an analyzer 42, intrusion detector 44, and accounting and billing system 46. Alternately, or in addition, one or more tap data streams can be forwarded through the network monitor ports 18 through a network port 30 of a another device 12 before delivery to a desired external device 42, 44, 46. Further, depending on the programmed configuration of the modified Ethernet switch 14, multiple tap data streams can be aggregated together and multiple network ports 18 can be bound together to provide flexibility in selection and effective bandwidth of the tap data streams produced by the device 12 and made available to any particular external device, such as the analyzer 42. This enables use of high-bandwidth analyzers and other monitoring devices that can accept a single monitoring output stream split across multiple physical ports. A split packet stream is automatically re-assembled by the analysis device into a single logical stream for evaluation.

Figure 2:
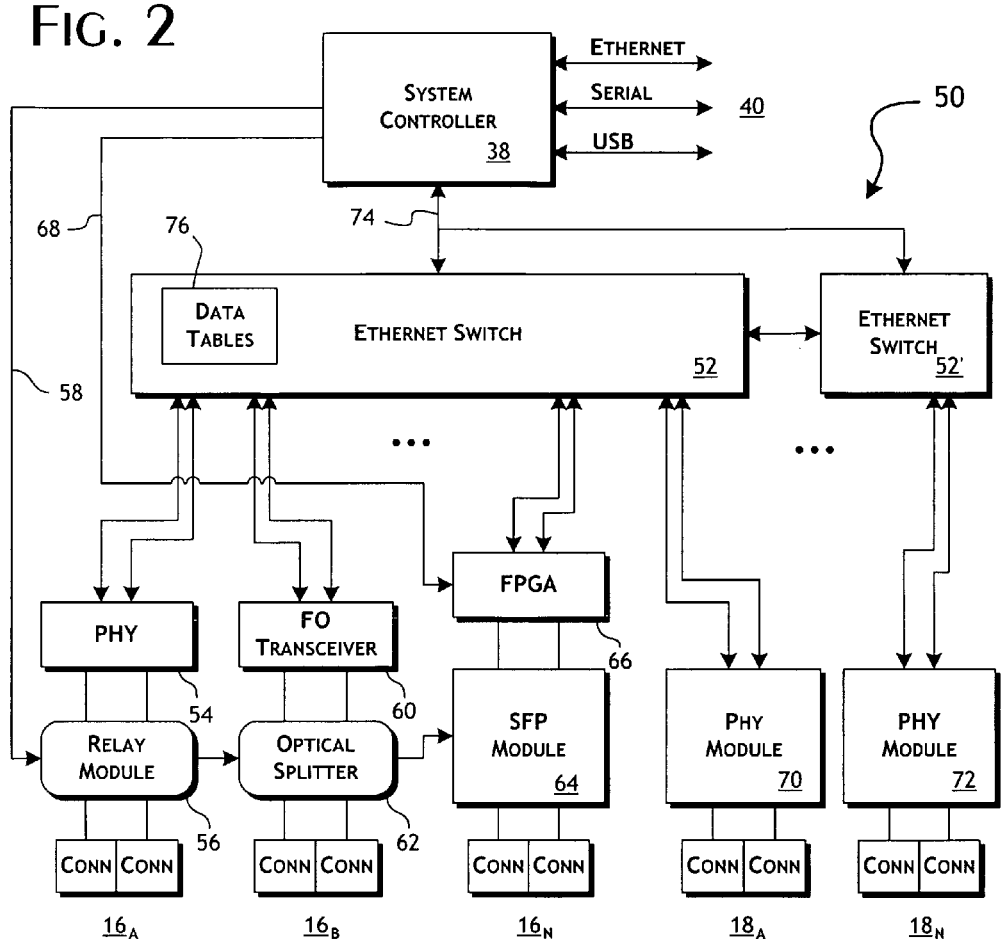
FIG. 2 provides an detailed block diagram view of an active tap network monitoring system constructed in accordance with a preferred embodiment of the present invention.

In accordance with the present invention, a modified Ethernet switch 14 can be constructed from one or more commodity Ethernet switch integrated circuits, with the number of Ethernet switch integrated circuits selected largely dependent on the number of network 16 and monitor 18 ports desired for implementation in a single device 12. While the specific manner of interconnecting or "stacking" Ethernet switch integrated circuits together will differ based on the manufacturer and model of the Ethernet switch integrated circuits used, such expansion connections are generally well-defined for creating larger conventional routed connection Ethernet switches. An exemplary embodiment, as shown in FIG. 2, of a switch system 50 includes multiple switch integrated circuits 52, 52' connected to support Ethernet links 16A-16N and monitoring ports 18A-18N. Physical layer interfaces may be implemented external to the switch integrated circuits 52, 52' and may support multiple port types, as variously appropriate for adaptation to copper and fiber media. For copper media ports, physical layer (PHY) interface circuits 54 provide for analog/digital conversion of Ethernet data stream signals. A digitally controllable 58, analog signal, mechanical relay module 56 provides a fail-safe loop through for a corresponding pair of network ports 16A. For fiber media ports, a fiber transceiver (FO) 60 is used to convert between light and electrical signals compatible with switch integrated circuits 52, 52'. A passive optical splitter 62 is preferably used to function as a fail-safe loop through for corresponding ports 16B, similar in function to the relay module 56. Ports may also be implemented as modular, removable devices 64, preferably utilizing Small Form-factor Pluggable (SFP) connection interfaces. Where the physical layer transport is not a native Ethernet protocol, frame conversion is performed by additional logic 66, implemented in a FPGA or other logic device, placed between the internal ports of the switch integrated circuits 52, 52' and physical layer, however implemented. For example SONET is frequently used to carry Ethernet traffic. As this data cannot be fed directly into switch integrated circuits 52, 52', logic 66 is used to convert between the SONET carrier protocol and native Ethernet frames.

The system controller 38 manages configuration and performs ongoing control over the switch integrated circuits 52, 52'. Characteristically, commodity switch integrated circuits 52, 52' will implement a conventional communications bus interface 74, such as SPI or I$^2$C, that can be used by the system controller 38 program to monitor and manage the internal operating configuration of the switch integrated circuits 52, 52'. The system controller 38 also preferably implements interfaces to support the external management console through one or more of Ethernet, serial and USB connections 40.

Figure 3:
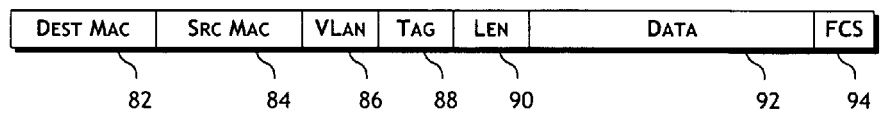
FIG. 3 is a block representation of an Ethernet data packet as processed through an active tap network monitoring system constructed in accordance with a preferred embodiment of the present invention.

In the preferred embodiments of the present invention, Ethernet Media Access Control (MAC) addressing is used to perform routing of packets from port to port within the switch integrated circuits 52, 52'. As generally illustrated in FIG. 3, Ethernet frames 80 contain, in significant part, MAC source and destination addresses 82, 84, Virtual LAN (VLAN) and Tag fields 86, 88, data length 90, data 92, and frame checksum 94 (FCS) fields. Ethernet source addresses are guaranteed unique by the manufacturers of Ethernet hardware, thus no two physical devices should ever have the same source address. Every packet sent contains this source address as well as a destination address, which the sending device determines based upon the desired destination for the packet. The VLAN and Tag fields 86, 88 conform to the IEEE 802.1Q VLAN used to define multiple virtual networks within a single shared network infrastructure segment. The length and data fields 90, 92 generally define the frame payload.

Upon initialization of the switch integrated circuits 52, 52', no information is available to define packet routing. Conventionally, all data packet traffic would be monitored and, initially, copied from the inbound port to all other physical ports of a switch, in effect broadcasting the packets to all connected devices. As further data packets transit the switch, the correspondences between source and destination MAC addresses and switch ports are recognized and added to a routing table constructed in switch memory 76, conventionally implemented as on-chip or external random-access memory. The logical mapping of MAC addresses to physical ports enables an efficient port-to-port routing of data packets between external devices, thereby avoiding packet broadcasts that would unnecessarily reduce the potential throughput of other ports as well as create a potential security risk.

Preferred embodiments of the present invention manipulate existing features of the switch integrated circuits 52, 52' in novel fashion to override and alter the steering of packets within the switch fabric provided by the switch integrated circuits 52, 52' under control of the system controller 38. This packet steering is performed without requiring real-time involvement by the system controller 38 in the evaluation of the MAC addresses of data packets transiting the switch. Rather, the imposed alternate operational control of the switch integrated circuits 52, 52' by the system controller 38 enables selective autonomous packet routing between multiple physical ports of the switch integrated circuits 52, 52' while avoiding undesired multi-path routing and looping. Specifically, in accordance with the present invention, the configuration of the switch integrated circuits 52, 52' is manipulated to transparently support port-to-port non-MAC-based routed paths and, further, multiple control ports that each tap from one or more other port-to-port routed paths through the switch integrated circuits 52, 52'.

The preferred embodiments of the present invention operate to prevent the conventional learning of MAC addresses by the switch integrated circuits 52, 52' utilizing any of a number of methods, chosen dependent upon the programmable configuration capabilities of a specific switch integrated circuits 52, 52'. For some types of switch integrated circuits 52, 52', the learning feature may be directly disabled through control programming externally applied by the system controller 38 via the bus 74. Such a capability is provided to enable conventional use of the switch integrated circuits 52, 52' as a simple hub device permanently set to broadcast all inbound port data packets to all other ports.

Where un-routed operation is not programmable or not chosen, preferred embodiments of the present invention utilize a switch memory 76 modification technique The routing tables built by switch integrated circuits 52, 52' within the switch memory 76 conventionally include various fields for MAC addresses, ports, 802.1Q VLAN tags, and other control data, where the specific content and structure of the built table will be defined by the switch integrated circuit manufacturer. These tables include fields, among others, for marking the validity of record entries, to determine how long a record will last before being expired and autonomously marked invalid, and to define the record as static and non-expiring. An exemplary table, associating MAC addresses with corresponding ports, is shown in FIG. 4. As generally illustrated, the routing function is effectively disabled by filling the table with invalid MAC address records that are marked static and therefore permanent, un-modifiable. Other alternatives include setting all routing table entries invalid, setting all table entries as expired and un-modifiable, and setting all table entries to never expire. Other possibilities will exist dependent on the available fields and autonomous operation of the switch integrated circuits 52, 52'. In each case, once the objective of rendering the routing table as functionally inoperative, all incoming packets will be considered as representing un-learned routes and nominally to be flooded to all ports.

In accordance with the present invention, discrete port-to-multiport, steering of internally broadcast data packets is accomplished by manipulation of other autonomously operating features implemented by current conventional switch integrated circuits 52, 52'. In the preferred embodiments of the present invention, the 802.1Q VLAN feature of current conventional switch integrated circuits 52, 52' is re-targeted to transparently perform internal data packet routing. The system controller 38 preferably programs the switch integrated circuits 52, 52' to apply unique private Virtual LAN IDs at each ingress port, to remove these private Virtual LAN IDs at each egress port, and establish a VLAN table that associates particular VLANs with physical ports, thereby limiting or defining the internal data packet broadcasts to occur only between specifically controlled ports. Received data packets can thereby be steered, without utilizing the conventional routing table function of the switch integrated circuits 52, 52', to both a specific link egress port, appropriate to maintain an Ethernet segment, and a tap port. The same tap port may be shared by multiple ingress/egress port pairings. Further, the tap port may be a logical port defined internal to a switch integrated circuit 52, 52' representing a bound set of two or more physical ports. The definition of bound ports is achieved through the programming of the switch integrated circuits 52, 52' by the system controller 38.

As generally illustrated in FIG. 5, each of the network ports 16$_{1-N}$ are assigned a VLAN ID for use internal to the switch integrated circuits 52, 52'. The otherwise broadcast distribution of received data packets is constrained to broadcast only to other network and monitor ports associated with the same VLAN ID. For the exemplary configuration shown in FIG. 5, ingress ports 0 and 1 the VLAN ID association allows egress on ports 1 and 0, defining a port-to-port segment link, with broadcast copies of the ingress data packets allowed egress on monitor port 0. Similarly, network port pairs 2 and 3, 4 and 5, and 6 and 7 are associated as port-to-port segment links, with broadcast copies aggregated for egress on monitor port 1. Network ports pairs 8 through 2N are associated as port-to-port segment links, with broadcast copies aggregated for egress on bound monitor ports 2 and 3.

In alternate embodiments of the present invention, other features of the switch integrated circuits 52, 52' may also be manipulated to achieve discrete port-to-port, including effectively discrete port-to-multiport, steering of internally broadcast data packets. In particular, the packet filtering capabilities of current conventional switch integrated circuits 52, 52' can be utilized to effect a switch internal routing function based on packet contents, such as discrete IP addresses, IP address ranges, or higher layer protocol information. Additionally, egress port controls may be used to further qualify the steered delivery of data packets within switch integrated circuits 52, 52'. An egress mask table, such as generally illustrated in FIG. 6, is stored in the switch memory 76, similar to the routing, VLAN, packet filtering, and other table data structures. As shown, the egress mask table defines records that determine, for each ingress port, the subset of egress ports permitted for broadcast distribution of data packets transiting the switch integrated circuits 52, 52'. The egress map function of the switch integrated circuits 52, 52' operates as an additional constraint to VLAN ID based steering of data packets. For network ports 0 and 1, egress is permitted on network ports 1 and 0, and monitor port 0. If the egress mask for network port 1 were changed to exclude monitor port 1, the tap data packet stream emitted from monitor port 0 would exclude ingress data packet traffic received on network port 1.

Figure 7:
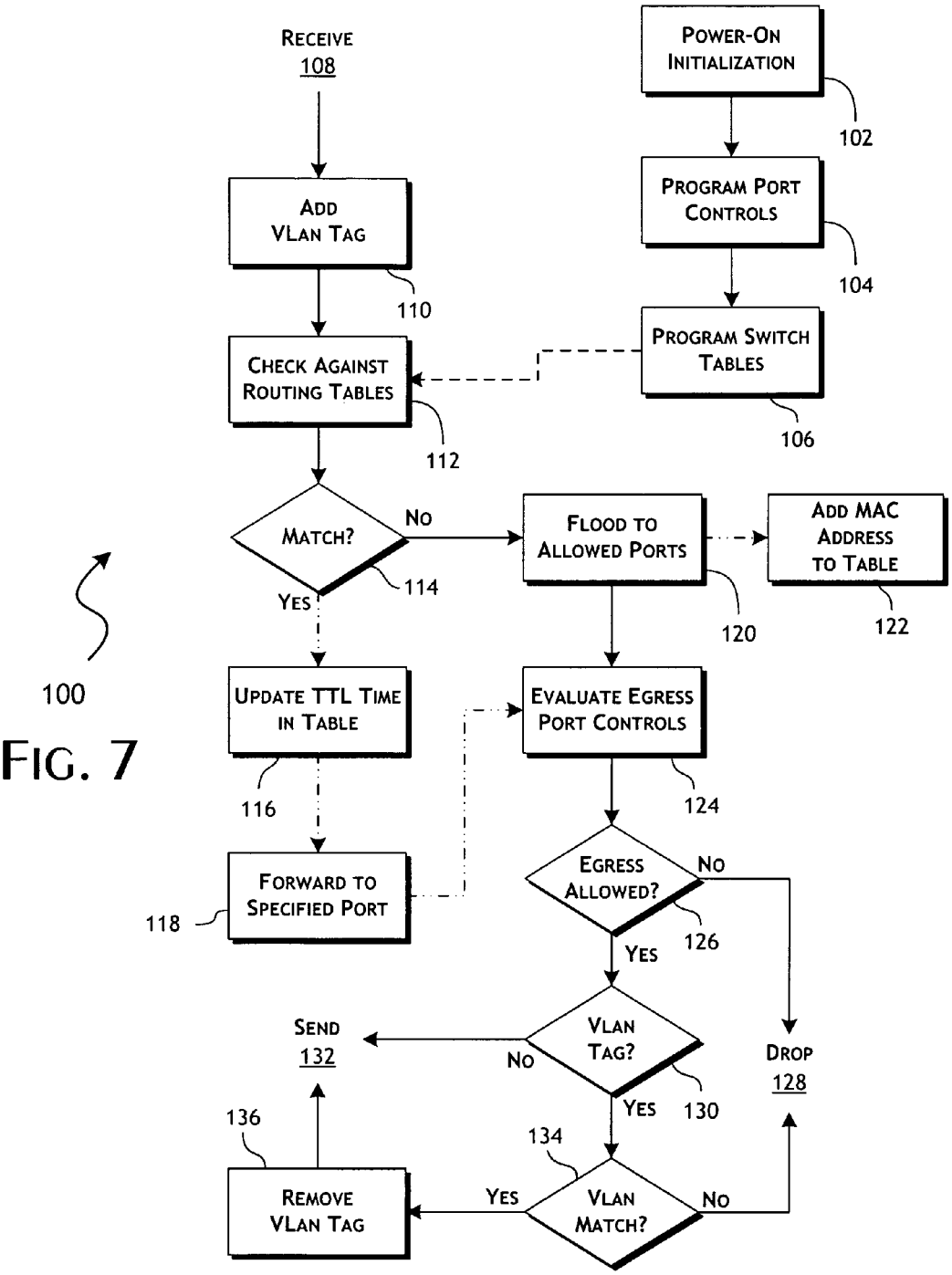
FIG. 7 presents a graphical flow chart describing a preferred method of controlling the transfer of data packets through an active tap network monitoring system, including switch integrated circuits, to implement port-to-multiport data packet transfers in accordance with a preferred embodiment of the present invention.

A preferred implementation of the discrete port-to-multiport, steering process 100 of the present invention is illustrated in FIG. 7. Prior to power-on initialization 102 of the component elements of the switch system 50, and in the event of a restart or other interruption in the ordinary operation of the switch system 50, the relays 56, 62 default to shunt the network data packet flows between the various port pairs 16$_{1-N}$, thereby ensuring that the connected network segments to continue to operate. During power-on initialization 102, the switch memory 76 will be initialized by the switch integrated circuits 52, 52'. The system controller 38 will also initialize and, through execution of the stored control program, operate to program 104, 106 the port controls switch tables to disable conventional MAC address-based routing and to establish port-to-multiport data packet steering. In programming the port controls 104, VLAN IDs are preferably defined for each ingress port and VLAN IDs to egress port associates established in the switch memory 76 resident tables of the switch integrated circuits 52, 52'. If used, egress port masks and packet filter specifications are also then programmed into the switch memory 76 resident tables. Once initialization and configuration of the switch system 50 is complete, the shunt relays 56, 62 are opened.

As thus initialized, the switch system 50 is enabled to receive 108 data packets on ingress ports 16$_{1-N}$. Preferably, the IEEE 802.1Q VLAN packet tag fields of data packets are updated 110 upon receipt to include an ingress port specific VLAN ID that will then be autonomously recognized by the switch integrated circuits 52, 52' as defining applicable egress ports. Consistent with the IEEE 802.1AD standard, two standard VLAN fields are available, with expansion possible to add further tags. In addition to the added VLAN ID, the present invention optionally provides for the encoding of further information into an otherwise unused tag field. This optional field can store data identifying ingress port, data packet timing, and other analysis relevant information. Fields other than excess IEEE 802.1Q VLAN packet tag fields may be utilized to carry such information. In preferred embodiments, this additional information is only added to data packets exiting the tap monitoring ports, thereby preserving the integrity of the ordinary network traffic propagated through the switch system 50.

The switch integrated circuits 52, 52' then autonomously check the data packet against the routing table 112. Where, in conventional use, a MAC address match 114 would result in updating of the TTL field of the corresponding route entry 116 and forwarding of the data packet to a route-specified port 118, the match attempt against the manipulated route table 114 will instead always fail. The switch integrated circuits 52, 52' will then autonomously broadcast the packet to all egress ports 120 subject to the VLAN defined constraints. Any attempt by the switch integrated circuits 52, 52' to update the manipulated route table 122 will fail, given that all record entries are in use and locked static.

As the internally broadcast data packets reach egress ports, the switch integrated circuits 52, 52' autonomously evaluate the port control programming 124 to determine whether egress is permitted. Where egress masks or packet filtering is employed, an egress port specific evaluation is performed 126. Non-conforming data packets, on a per egress port basis, are dropped 128. The VLAN tag fields of conforming data packets are then evaluated 130, again on a per egress port basis. Where the egress port associated VLAN ID does not match the data packet embedded VLAN ID, the data packet is dropped 128. In preferred embodiments of the present invention, the absence of an applicable port-to-multiport VLAN ID is treated as a wildcard match 130 and sent 132, subject to any egress restriction masks. Where an applicable port-to-multiport VLAN ID is present and matched 134, the VLAN ID is preferably removed 136 before sending 132, particularly for egress ports carrying ordinary network traffic propagated through the switch system 50.

During operation, the system controller 38 can dynamically update and alter the port control configuration of the switch integrated circuits 52, 52' including the port-to-multiport steering of data packets. While Ethernet links have numerous configuration options, each pair of network segment link ports are ideally configured to the same speed and duplex. In preferred embodiments of the present invention, the system controller 38 operates to monitor and, as needed, force the adjustment of the negotiated speed and duplex in order to achieve a matching of the port pair speed and duplex parameters. After automatic configuration is completed, the results are stored in non-volatile memory, preferably resident in the system controller 38, so that negotiated re-configuration is not required after subsequent power cycles. Rather, the system controller 38 can initially program the ports with the last negotiated speed and duplex parameters, subject to allowing renegotiation when connected device settings cause link changes and on detection of data errors or a switch system 50 operator directed reset of the port configuration. Port self-configuration can also be disabled by the operator on a per port basis.

Alternately, different speed and duplex settings for a network segment link port pair can be supported by the switch system 50 by utilizing internal memory to buffer data packets as necessary to bridge the data connection between the link ports. Significantly, this capability allows the switch system 50 to support network segment links utilizing different media types.

Also, when two external end devices connected through the switch system 50 have different communications capabilities, the auto-negotiation process may not function properly as the interposing switch system 50 shields the two end devices from negotiating with each other directly. In this case, the system controller 38 monitors for and recognizes that the two end devices are advertising differing capabilities. The system controller 38 then determines a best fit configuration for each of the ports of the network segment port pair and allows the end devices to connect. Thus, the resulting link will be established at the correct speed and parameters, just as if the two end devices had directly negotiated. The determined port configuration information is preferably saved in non-volatile memory for use in re-configuration upon subsequent power cycles, subject to link requirement changes due to, for example, changes in the end devices.

In addition to being able to dynamically enable, disable, and force renegotiation of port communications parameters, the system controller 38 can dynamically reconfigure the association of tap monitoring ports with different network segment links. Specifically, the members of a VLAN can be dynamically changed, allowing redirection of the tap data packets to be directed to different tap monitor ports. The tap data packets from one or more network segment links can be steered to a tap monitor port, all being members of the same defined VLAN. By changing the VLAN membership to include a different tap monitor port, the tap data packets can be directed to, for example a different external monitoring device. By controlling the VLAN membership of the different tap monitor ports, specifically enabling a tap monitor port to be a member of multiple VLANs, the aggregation of network port data packet traffic on to one or more of the tap monitoring ports can be directly and dynamically controlled by the system controller 38.

In preferred embodiments, the system controller 38 also monitors for network failures occurring on either side of a connected network segment link. If a connected network fails due to an external fault, the other side of the link will be unaware of the failure due to the intervening presence of the switch system 50. To support external network infrastructure capable of fail-over to backup network segments, the system controller 38 will preferably operate to propagate a network segment failure to the remaining side of the segment link. Either the corresponding relay 56, 62 can be deactivated or the remaining port can be shutdown to effectively simulate the network failure. Through continued monitoring, the system controller 38 can restore the link connection though the switch system 50 whenever both sides of the link segment become active again.

Figure 8:
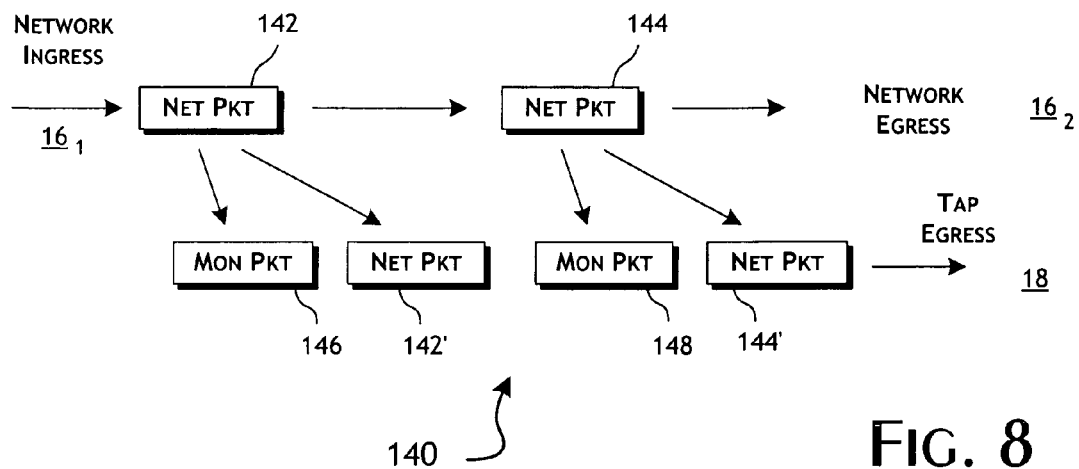
FIG. 8 provides a block representation of an network data packet stream modified to include ancillary monitor data packets as part of the monitor data stream in accordance with a preferred embodiment of the present invention.

In alternate embodiments of the present invention, additional information can be introduced into the monitored tap packet data stream by adding additional data packets, generally as shown in FIG. 8. Network data packets 142, 144, received on an ingress port 16$_1$ are steered, port-to-multiport, to the corresponding network egress port 16$_2$ with broadcast duplicated data packets 142', 144' steered to a monitored tap port 18. Additional monitor data packets 146, 148 are introduced into the data stream steered to the monitored tap port 18, preferably immediately after associated tapped network data packets. These additional monitor data packets 146, 148 can be used to carry information about the associated network data packets 142, 144, including ingress port identity, time of ingress, flags indicating matches to specific upper layer data content, notifications of data payload truncation or errors within the packet. Additionally, ingressing packets that are discovered to be are in error, such as invalid length or FCS are corrected, a new FCS is calculated, thus allowing the frames to transit the switch chip and subsequent analysis devices hardware without being discarded and thus unseen. The data content of the network data packets 142, 142', 144, 144' thus remain essentially unchanged, yet significant information relevant to the monitoring of the Ethernet data streams can be reliably captured and transmitted to analysis devices 42.

In an alternate embodiment of the present invention, the payload portion of the monitor data packets 146, 148 may be modified or truncated to limit the size of frames passed onto the monitoring ports, correspondingly reducing the bandwidth burden. The packet header containing upper layer information is retained and a new CRC value is calculated and incorporated into the payload truncated frame, resulting in the consistent creation of valid data packet. Truncation is desirable where much larger data volumes are to be monitored and stored and where visibility into the payload is not desired, such as for data collection and forensics applications. Alternately, or in addition, a filter-based analysis may select only certain data packets for inclusion in the monitor data stream. For example, tap data packets related to the opening and closing of network connections may be allowed, while tapped data packets representing the contents of large monolithic data transactions, such as a TCP stream or FTP transfer, are discarded. This will allow analysis of connections opening, closing and other data protocol actions without being burdened by the collection of the contents of the streams themselves, which may be voluminous and of no value.

As an alternate to the synchronous injection of the monitor data packets 146, 148, identifiers of corresponding network data packets 142, 144 can be included in the data payload of the monitor data packets 146, 148. A mapping or other association of monitor data packets 146, 148 to network data packets 142, 144 can be made by the analysis devices 42 based upon a unique ID field, such as the data packet FCS value or a hash based upon some selection of packet fields. This allows the steering of the network data packets 142', 144' and monitor data packets 146, 148 to different top egress ports 18$_1$, 18$_2$, as may be desirable to not increasing the primary monitoring port 18$_1$ utilization by the introduction of additional traffic.

Figure 9:
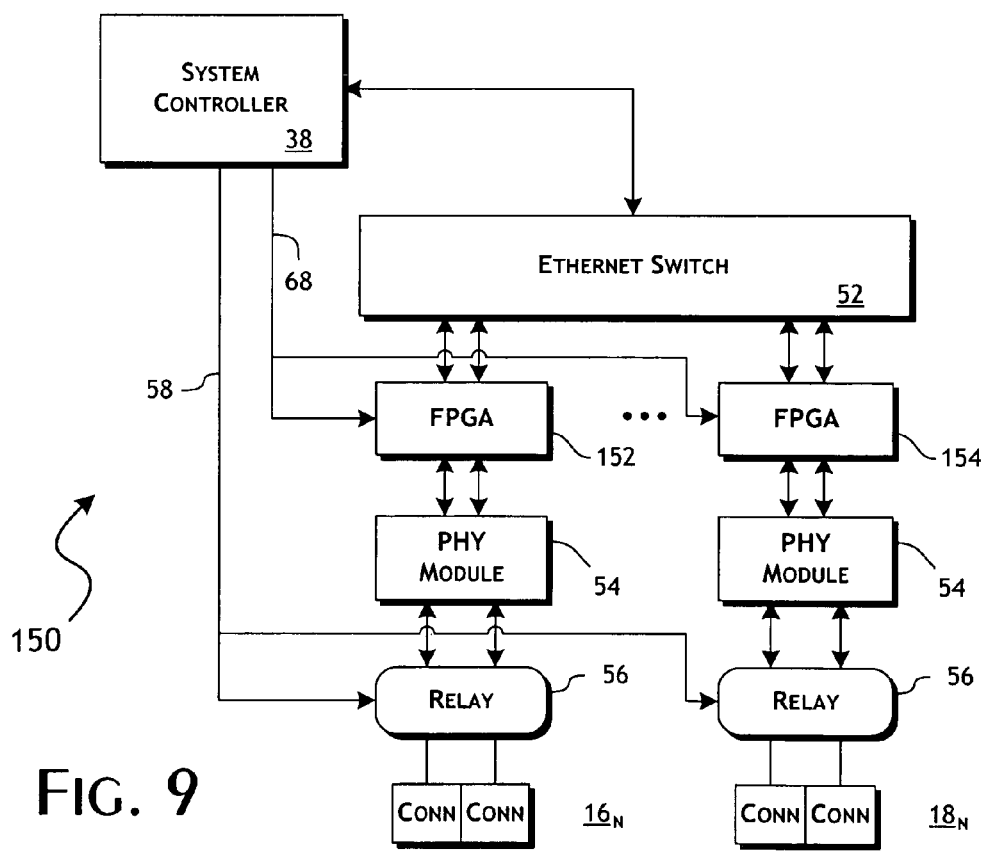
FIG. 9 presents a block diagram showing implementation of additional logic to the switch integrated circuits to provide supporting and ancillary functions in conjunction with the port-to-multiport transfer of data packets through an active tap network monitoring system constructed in accordance with a preferred embodiment of the present invention.

To implement VLAN ID-based port-to-multiport data packet steering, packet VLAN ID tagging capabilities may exist in conventional switch integrated circuits 52, 52' and can be utilized, in accordance with the present invention, for the purely internal distribution control of data packets within the switch integrated circuits 52, 52'. Otherwise, and as desired to create the additional monitor data packets 146, 148, an FPGA or other logic unit external to the switch integrated circuits 52, 52' is implemented as generally illustrated in FIG. 9. In addition to any needed protocol conversion and framing operations, such as implemented in the case of FPGA 66, an FPGA 152 is preferably provided to inspect incoming packets on each of the network ingress ports 16$_{1-N}$. The FPGA 152 is preferably programmable 68, by the system controller 38, with the port-specific data to autonomously add IEEE 802.1Q and/or 802.1AD VLAN tags to data packets on ingress and, preferably, to remove or mask the togs on egress. The addition of the tags may be automatic for all ingress data packets or performed selectively by the FPGA 152 based upon the contents of selected fields of individual data packets. For example, the contents of the IP address field within data packets may be used to trigger assignment of a specific VLAN tag to the data packet, where the IP address matches a programmed source or destination IP address or range of IP addresses or a packet transmission protocol identifier. The data packet is forwarded on to the switch integrated circuits 52, 52'. The autonomous VLAN routing functionality resident in the switch integrated circuits 52, 52' then operates steer data packets for egress only through the VLAN member egress ports, as programmatically defined by the system controller 38, which will preferably include the egress network port and desired tap monitoring ports, thus achieving specifically controlled port-to-multiport steering of data packets. Preferably, where the switch integrated circuits 52, 52' do not incorporate suitable functionality, the FPGAs 152 will remove or mask the VLAN ID tags used for steering internal to the switch integrated circuits 52, 52'.

In addition to specifying a VLAN ID, a IEEE 802.1Q or 802.1AD priority tag value can also be added to the incoming data packets. Preferably, the priority value is assigned based on port of ingress. The priority value is programmed by the system controller 38 into the switch integrated circuits 52, 52' where suitable autonomous control functionality is present, or the FPGAs 152. Where the bandwidth capability of an egress port is exceeded, which is most likely to occur where a tap monitor port is used to aggregate multiple network data packet streams as a member of multiple VLANs, tap data packets will be dropped by the autonomously operation of the switch integrated circuits 52, 52' based on the relative data packet priority values. Consequently, the integrity of the high-priority data packet streams are preferentially maintained. Still, any such packet data loss will be visible to the system controller 38, which can then determine and dynamically reconfigure VLAN memberships preferably to better balance the use of the tap monitor ports and, at a minimum, signal a need for operator intervention. The FPGAs 152 are also preferably programmable 68 to perform packet filtering, alone or in combination with any packet filtering capabilities provided by the switch integrated circuits 52, 52'. In combination with packet reframing, the FPGAs 152 can perform the monitor packet 146, 148 injection described above in connection with FIG. 8, including the selective packet filtering and truncation operations described there.

In alternate preferred embodiments of the present invention, FPGAs 154 are provided on the monitor ports 18$_{1-N}$ supported by the switch integrated circuits 52, 52', also generally as shown in FIG. 9. The monitor port FPGAs 154 preferably provide for selective processing of tap data packets on egress from the switch integrated circuits 52, 52'. This processing, separately programmable 68 by the system controller 38, can perform selective encapsulation, encryption and de-fragmenting of analysis relevant information carried by the tap data packets. The ability to encrypt and/or encapsulate the tap data packets is particularly useful where the tap data stream is to be externally routed over existing packet data networks. Encryption is used to secure the content of the data packets while encapsulation allows multiple packet payloads to be collected together, generally reducing the data packet traffic load incurred by the shared use of a network segment for analyzer data.

The FPGAs 152, alone or in combination with the FPGAs 154, are preferably constructed, in an alternate embodiment, to enable timing synchronization between network port pairs 16$_{1-N}$ or arbitrary combinations of network and monitor ports 16$_{1-N}$, 18$_{1-N}$. Synchronous Ethernet is a variant of standard Ethernet that has software or hardware provisions for extracting accurate clock and/or delay information from the Ethernet data signal. This alternate embodiment is constructed such that this timing information is extracted by the FPGAs 152, where such a capability is not already provided by the switch integrated circuits 52, 52', and then used to re-clock outbound data streams, either as network port pairs or by selection of a network ingress port to be used as master timing source and egress ports that will operate synchronously.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A network data monitoring apparatus configured to provide monitor data streams representative of network data streams, said network data monitoring apparatus comprising:

a) a plurality of network port connector pairs, wherein each said network port connector pair is coupleable to provide an interposed connection link in a data network segment capable of bidirectional network data packet transfer;

b) a plurality of monitor output ports, wherein each said monitor output port is coupleable to monitor network segments for tap data packet transfer;

c) a network switch subsystem operative to transfer network data packets between said plurality of network port connector pairs and, as tap data packets, to said plurality of monitor output ports, said network switch subsystem having a disabled layer-2 routing function and an enabled internal port-to-multiport network data packet distribution function wherein broadcast distribution of network data packets internal to said network switch subsystem is autonomously constrained to respective said network port connector pairs and, for each said network connector pair, a selected set of said monitor output ports; and d) a controller coupled to said network switch subsystem, wherein said controller is operative to configure predetermined constraint relations defining said network port connector pairs and said selected sets of said monitor output ports, wherein said predetermined constraint relations includes virtual network identifiers discretely assigned with respect to each of said network port connector pairs and wherein said network switch subsystem is autonomously operative to constrain broadcast distribution of network data packets based on assigned virtual network identifiers, said predetermined constraint relations being determinative of the autonomous operation of said network switch subsystem.

2. The network data monitoring apparatus of claim 1 wherein said predetermined constraint relations define, for each said network data packet received by said network switch subsystem, a network port pair association and a monitor port association and wherein said network switch subsystem is responsive to said network port pair association and said monitor port association to constrain the broadcast distribution of each said network data packet to the complementary member of said network port pair association and said monitor port association.

3. The network data monitoring apparatus of claim 2 wherein said network switch subsystem is operative to apply virtual network identifiers to network data packets as received with respect to said network port connector pairs and wherein said network switch subsystem.

4. The network data monitoring apparatus of claim 3 wherein said virtual network identifiers applied by said network switch subsystem are effective only within said network switch subsystem.

5. A method of monitoring network data streams transferred bidirectionally through network segments with tap data streams being output through monitor network ports, said method comprising the steps of:

a) intercepting a plurality of network segments by a network switch subsystem having a plurality of network ports, wherein said plurality of network ports are associated as a plurality of network port pairs, and wherein each said network port pair is associated with a respective one of said plurality of network segments;

b) first associating packet steering identifiers with the ports of said plurality of network port pairs, wherein each said port pair is associated with a corresponding one of said packet steering identifiers;

c) second associating packet steering identifiers with the ports of a plurality of monitor ports, wherein each said monitor port is associated with a set of said packet steering identifiers; and d) autonomously broadcast distributing, internal to said network switch subsystem, network data packets received on said plurality of network ports, wherein said broadcast distribution is constrained to delivering network data packets for output on the ports of said plurality of network ports and said plurality of monitor ports having a like associated said packet steering identifier, wherein said network switch subsystem, for each port of said plurality of network ports, assigns a packet steering identifier corresponding to the port of ingress from said plurality of network segments and wherein said step of autonomous broadcast distributing is operative to distribute network data packets based on said assigned packet steering identifiers, wherein said packet steering identifier is a virtual network identifier.

6. The method of claim 5 wherein said virtual network identifier conforms to the IEEE 802.1Q VLAN standard.

7. The method of claim 6 wherein said virtual network identifier is assigned to a predetermined field defined within a network data packet in conformance with the IEEE 802.1AD standard.

8. A network data monitoring apparatus configured to transparently derive monitor data streams from transiting network data streams, said network data monitoring apparatus comprising:

a) a programmable network data packet router having a plurality of network ports, said programmable network data packet router being coupleable within the data transfer path of a plurality of network data streams, said programmable network data packet router being statically programmed to transfer network data packets of said plurality of network data streams between respective pairs of network ports, said programmable network data packet router being operative to selectively derive and route tap network data packets from said plurality of network data streams to a plurality of tap data ports, said programmable network data packet router being programmed to route said tap network data packets according to virtual network paths defined internal to said network data monitoring apparatus;

b) a controller operative to program said programmable network data packet router; and c) data packet modification logic operative to add predetermined virtual network identifiers into network data packets ingressing said network data monitoring apparatus and to remove said predetermined virtual network identifiers from network data packets egressing said network data monitoring apparatus, the content of said predetermined virtual network identifiers defining a correspondence with said plurality of network data streams, whereby said virtual network paths are maintained internal to said network data monitoring apparatus.

9. The network data monitoring apparatus of claim 8 wherein said controller is operative to determine said predetermined virtual network identifiers as added to ingressing network data packets.

10. The network data monitoring apparatus of claim 9 wherein said controller is operative to selectively associate said predetermined virtual network identifiers with said plurality of tap data ports and wherein said programmable network data packet router is configured to aggregate tap data packets from first subsets of said plurality of network data streams to second subsets of said plurality tap data ports.

11. The network data monitoring apparatus of claim 10 wherein said data packet modification logic is further operative to add predetermined priority values into network data packets ingressing said network data monitoring apparatus and to remove said predetermined priority values from network data packets egressing said network data monitoring apparatus, the value of said predetermined priority values being defined relative to said plurality of network data streams.

12. The network data monitoring apparatus of claim 11 wherein said programmable network data packet router is configured to selectively aggregate, based on said predetermined priority values, tap data packets from first subsets of said plurality of network data streams to second subsets of said plurality tap data ports, subject to the bandwidth capacity of said second subsets of said plurality of tap data ports.

13. The network data monitoring apparatus of claim 12 wherein said controller is operative to programmatically establish a virtual network path internal to said network data monitoring apparatus, corresponding to first and second ones of said plurality of network data streams, to provide a first tap data stream at a first one of said plurality of tap data ports.

14. The network data monitoring apparatus of claim 13 wherein said controller is operative to programmatically establish said virtual network path and bind said first tap data stream through said first and a second one of said plurality of tap data ports.

15. The method of claim 14 wherein said predetermined virtual network identifiers conform to the IEEE 802.1Q VLAN standard.

16. The method of claim 15 wherein said predetermined priority values conform to the IEEE 802.1Q or 802.1AD standards.

* * * * *